United States Patent Office 3,832,373
Patented Aug. 27, 1974

---

3,832,373
HYDROXAMIC ACID DERIVATIVES OF 1-AMINO-CYCLOHEXANECARBOXYLIC ACID
Harvey E. Alburn, West Chester, Donald E. Clark, Norristown, Norman H. Grant, Wynnewood, and Milton Lapidus, Rosemont, Pa., asssignors to American Home Products Corporation, New York, N.Y.
No Drawing. Original application Nov. 5, 1969, Ser. No. 874,382, now Patent No. 3,703,542. Divided and this application May 22, 1972, Ser. No. 255,825
Int. Cl. C07c 119/16
U.S. Cl. 260—453 R
3 Claims

ABSTRACT OF THE DISCLOSURE

The compounds are hydroxamic acids of alicyclic amino acids and esters of said compounds, all of which have valuable pharmacodynamic properties in that they relieve hyperglycemia in warm-blooded animals.

---

This application is a divisional of application Ser. No. 874,382, filed Nov. 5, 1969, now U.S. Patent. 3,703,542.

DESCRIPTION OF THE INVENTION

This invention relates generally to novel chemical compounds having valuable pharmacodynamic properties and to processes for preparing said compounds.

The novel compounds of the invention are the hydroxamic acids and esters of 1-aminocyclohexanecarboxylic acid encompassed within the following general formula:

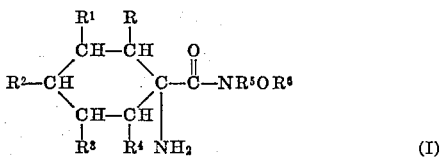

wherein: each of R, $R^1$, $R^2$, $R^3$ and $R^4$ is selected from the group consisting of hydrogen, lower alkyl, lower alkoxy, hydroxy, halogen, nitro and amino, with the proviso that at least 2 of R, $R^1$, $R^2$, $R^3$ and $R^4$ are always hydrogen; and each of $R^5$ and $R^6$ is selected from the group consisting of hydrogen, lower alkyl, phenyl and phenyl(lower)alkyl; and the pharmaceutically-accepted acid-addition salts thereof. The phenyl and phenyl(lower)alkyl groups may also be substituted in any one or two positions on the benzene ring by a substituent selected from the group consisting of lower alkyl, lower alkoxy, hydroxy, halogen, nitro and amino.

The novel compounds of formula (I) above may conveniently be prepared by heat-reacting a selected hydroxylamine derivative with a selected 1-aminocyclohexanecarboxylic acid N-carboxyanhydride (NCA) in accordance with the following scheme:

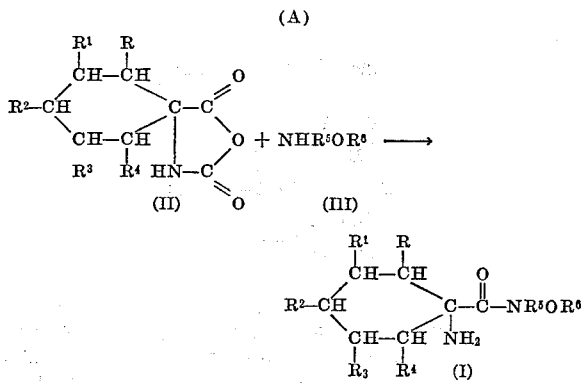

wherein R, $R^1$, $R^2$, $R^3$, $R^4$, $R^5$ and $R^6$ have the same meanings described hereinbefore.

The reactants (III), i.e., the hydroxamic acid derivatives, employed in the preparative process illustrated by the above reaction scheme are known compounds which are readily available from commercial sources. The reactants (II), i.e., the NCA's of the 1-aminocycloalkylcarboxylic acids, which are not commercially available, can easily be prepared in accordance with standard organic procedures well known to those skilled in the art. For example, a procedure which has been employed to synthesize the anhydrides of formula (II) above is described in U.S. Pat. 3,206,455, "Process for Producing 6-(α-aminoacylamino) Pencillanic Acids," H. E. Alburn and N. H. Grant.

It has been discovered that compounds of formula (I) meeting the described qualifications have valuable pharmacological properties. More specifically, said compounds have been found to have unexpected activity in relieving hyperglycemia in warm-blooded animals as referred to in greater detail hereinafter.

In vivo testing of the new compounds for their hyperglycemic activity is carried out as described in the literature [cf. the article of H. E. Alburn and R. L. Fenichel, Nature 213, 515 (1967)] as follows:

After one week on a high-flat, high-protein diet, six male Sprague Dawley rats are fasted for 18 hours. An initial blood sample is taken by cardiac puncture, then 30 mg./kg. of the text compound is given by gavage. Thirty minutes later, the animals are injected intraperitoneally with 1 ml. of buffered cysteine solution containing 5 mg. of reduced insulin B-chain and 5 mg. of albumin. A second identical injection is given at 60 minutes and blood samples are taken at 60, 90, and 140 minutes after the first one. Control groups of six rats are run with B-chain-albumin alone and with compound alone. Compounds showing activity in blocking the B-chain induced hyperglycemia are tested at lower concentrations and the results are expressed as the lowest concentration showing a significant effect. The compounds of the invention show such effect when administered at 30 mg./kg.

The surprising efficacy of the compounds of formula (I) above in the test described hereinbefore has clearly indicated that they are active anti-hyperglycemic agents.

In the exercising of the method of the invention, the compounds of formula (I) used therein may be administered alone or in combination with pharmaceutically acceptable carriers, the proportion of which is determined by the solubility and chemical nature of the compound selected, the chosen route of administration, and standard pharmaceutical practice. For example, they may be administered orally in the form of tablets or capsules, which may contain conventional excipients, or in the form of solutions; or they may be injected parenterally, that is intramuscularly, intravenously or subcutaneously. For parenteral administration, they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

The compounds (1) of the present invention, when tested in accordance with the test procedure given in detail hereinbefore, are effective to relieve hyperglycemia at dosages in the range of about 10 to about 80 mg./kg. of body weight of the animals tested.

The following examples are illustrative of the preparation of the novel compounds of the invention which are useful in relieving hyperglycemia in warm-blooded animals:

EXAMPLE I

1-Aminocyclohexanecarbohydroxamic Acid

Ten grams of hydroxylamine hydrochloride were treated with 5.8 g. of sodium hydroxide in 125 ml. of methanol. After removal of NaCl, the filtrate was chilled and stirred with 12 g. of N-carboxy-1-aminocyclohexane carboxylic acid anhydride. After gas evolution ceased, the solution was passed through an anion exchanger in the Cl⁻ form. The effluent liquid, which gave the positive iron test for hydroxamic acids, was evaporated to dryness. When tested in a system in which insulin B-chain blocked the action of insulin as described hereinbefore, the titled hydroxamic acid reversed the blockage, thereby showing an insulin-preserving hyperglycemic effect.

EXAMPLE II

1-Amino-N-Benzyloxycyclohexanecarboxamide

Eight grams of O-benzylhydroxylamine hydrochloride were treated with an equivalent amount of sodium methoxide in 100 ml. of methanol, and the sodium chloride was removed. After removal of the methanol, the O-benzylhydroxylamine was dissolved in 200 ml. of tetrahydrofuran, and to it is added a solution of 7.75 g. of N-carboxy-1-aminocyclohexane carboxylic acid anhydride in 100 ml. of tetrahydrofuran. The mixture is allowed to stand at 4° for 4 days and is then filtered. The filtrate is evaporated to dryness and the residue is dissolved in 150 ml. of hot ethanol. A crystalline product forms on cooling.

The product, which is the titled compound, is an orally effective anti-hyperglycemic agent when tested in accordance with the test procedure described hereinbefore.

EXAMPLE III

Following the procedure of Example I, a series of hydroxylamine derivatives are separately reacted with the NCA of 1-aminocyclohexanecarboxylic acid (ACHCA) to obtain the hydroxamic acid derivatives of the latter in the form of their HCl acid-addition salts having anti-hyperglycemic activity, as set forth in Table A below:

TABLE A

| Hydroxylamine derivative | Substituted NCA of 1-ACHCA | Hydroxamic acid derivative of the amino acid |
|---|---|---|
| Hydroxylamine | 2-ethyl-1-aminocyclohexane carboxylic acid. | 2-ethyl-1-aminocyclohexanecarbohydroxamic acid. |
| Do | 3-methoxy-1-aminocyclohexane carboxylic acid. | 3-methoxy-1-aminocyclohexanecarbohydroxamic acid. |
| O-ethylhydroxyl-amine. | 3-hydroxy-1-aminocyclohexane carboxylic acid. | 3-hydroxy-1-amino-N-ethoxycyclohexane carboxamide. |
| O-propylhydroxyl-amine. | 2-chloro-1-aminocyclohexane carboxylic acid. | 2-chloro-1-amino-N-propoxycyclohexane carboxamide. |
| O-methylhydroxyl-amine. | 2-fluoro-1-aminocyclohexane carboxylic acid. | 2-fluoro-1-amino-N-methoxycyclohexane carboxamide. |
| Hydroxylamine | 2-propyl-3-ethoxy-1-aminocyclohexane carboxylic acid. | 2-propyl-3-ethoxy-1-aminocyclohexanecarbohydroxamic acid. |

EXAMPLE IV

Following, in this instance, the procedure of Example II, another series of hydroxylamine derivatives are separately reacted with the selected NCA's of 1-aminocyclohexane carboxylic acid to obtain the hydroxamic acid derivatives of the latter in the form of their bases which have anti-hyperglycemic activity, as set forth in Table B below:

TABLE B

| Hydroxylamine derivative | Substituted NCA of 1-ACHCA | Hydroxamic acid derivative of the amino acid |
|---|---|---|
| O-phenylhydroxyl-amine. | 2-nitro-1-aminocyclohexane carboxylic acid. | 2-nitro-1-amino-N-phenoxycyclohexane carboxamide. |
| Do | 3-ethyl-1-aminocyclohexane carboxylic acid. | 3-ethyl-1-amino-N-phenoxycyclohexane carboxamide. |
| O-benzylhydroxyl-amine. | 2,3-dichloro-1-aminocyclohexane carboxylic acid. | 2,3-dichloro-1-amino-N-benzyloxycyclohexane carboxamide. |

EXAMPLE V

1-Amino-N-Methycyclohexane-carbohydroxamic Acid

To a solution of 5.54 g. of N-methylhydroxylamine hydrochloride in 218 ml. of absolute ethanol there was added 32.5 ml. of 2 M sodium methoxide. After stirring for one hour, sodium chloride was removed by filtration, and 10 grams of N-carboxy-1-aminocyclohexane carboxylic acid anhydride is added. After stirring for 2.5 hours, the system is allowed to stand at room temperature overnight. The precipitate is removed, and the filtrate is evaporated to dryness on a rotary evaporator. The product is washed with ether.

In the test referred to hereinbefore, the titled product exhibits anti-hyperglycemic activity.

EXAMPLE VI

Following the procedure of Example V, a series of hydroxamic acid derivatives are separately reacted with a selected substituted NCA of 1-aminocyclohexane carboxylic acid to obtain the hydroxamic acid derivatives of the latter in the form of their bases which have said stated activity, as set forth in Table C below:

TABLE C

| Hydroxylamine derivative | Substituted NCA of 1-ACHCA | Hydroxamic acid derivative of the amino acid |
|---|---|---|
| N-propyl-O-ethyl-hydroxylamine. | 2-propyl-1-aminocyclohexane carboxylic acid. | 2-propyl-1-amino-N-propyl-N-ethoxy-cyclohexane carboxamide. |
| N-benzylhydroxyl-amine. | 3-propoxy-1-aminocyclohexane carboxylic acid. | 3-propoxy-1-amino-N-benzyl-cyclohexane carbohydroxamic acid. |
| N-phenoxyhydroxyl-amine. | 2-chloro-1-aminocyclohexane carboxylic acid. | 2-chloro-1-amino-N-phenoxy-cyclohexane carbohydroxamic acid. |
| N-methyl-O-propyl-hydroxylamine. | 1-aminocyclohexane carboxylic acid. | 1-amino-N-methyl-N-propoxy-cyclohexane carboxamide. |

We claim:
1. A compound of the following formula:

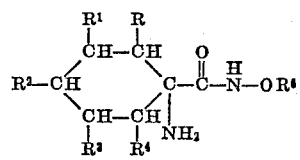

wherein: R and R⁴ are selected from the group consisting of hydrogen, lower alkyl and hydroxy; R¹, R² and R³ are selected from the class consisting of hydrogen and lower alkyl, with the proviso that at least two of R, R¹, $R^2$, $R^3$ and $R^4$ are always hydrogen; $R^6$ is selected from the group consisting of lower alkyl, phenyl and benzyl; and the pharmaceutically-accepted acid-addition salts thereof.

2. A compound as defined in claim 1, which is: 1-amino-N-benzyloxycyclohexane carboxamide.

3. A compound as defined in claim 1, which is: 3-ethyl-amino-N-phenoxycyclohexane carboxamide.

References Cited

UNITED STATES PATENTS

| 3,306,727 | 2/1967 | Neighbors | 71—118 |
| 3,439,018 | 4/1969 | Brookes et al. | 71—118 |
| 3,475,485 | 10/1969 | Davis | 260—453 R |

OTHER REFERENCES

Connors et al.: "The Pharmacology and Tumour Growth Etc." (1960), Biochem. Pharm., 5, pp. 108–29 (1960).

Pinchuk et al.: "N-(Cyanoalkyl)- and N-(Cyanocycloalkyl) Etc." (1967), CA, 67, No. 108169; (1967).

Hopkins et al.: "Syn. and Herb. Activity of Small-Ring Cmpds." (1967), J. Agr. Food Chem., 15, pp. 501–07 (1967).

GLENNON H. HOLLRAH, Primary Examiner

U.S. Cl. X.R.

424—298, 320, 324